Dec. 13, 1966    P. V. SNYDER    3,291,968
CONTROL MECHANISM FOR AN ELECTRIC COOKING APPLIANCE
Filed Dec. 11, 1963    2 Sheets-Sheet 1
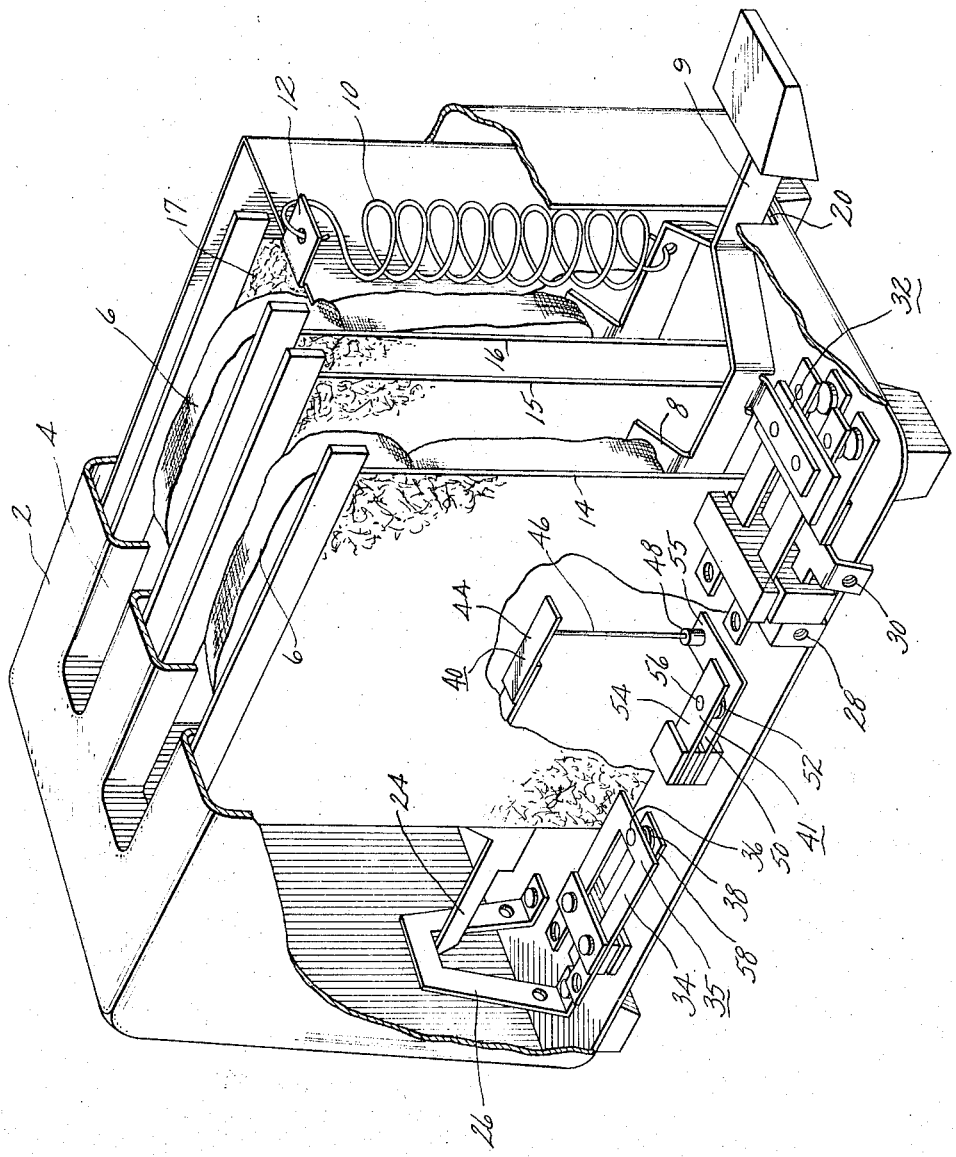
Inventor:
Paul V. Snyder,
by Laurence R. Kempton
His Attorney Dec. 13, 1966   P. V. SNYDER   3,291,968
CONTROL MECHANISM FOR AN ELECTRIC COOKING APPLIANCE
Filed Dec. 11, 1963   2 Sheets-Sheet 2
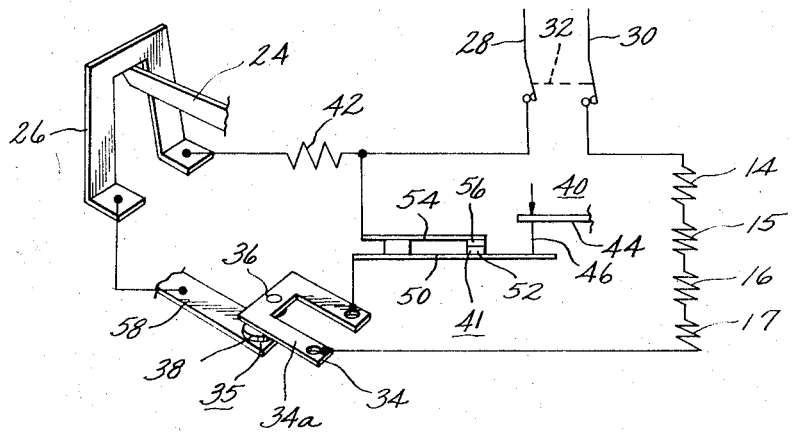
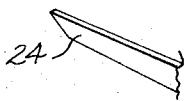
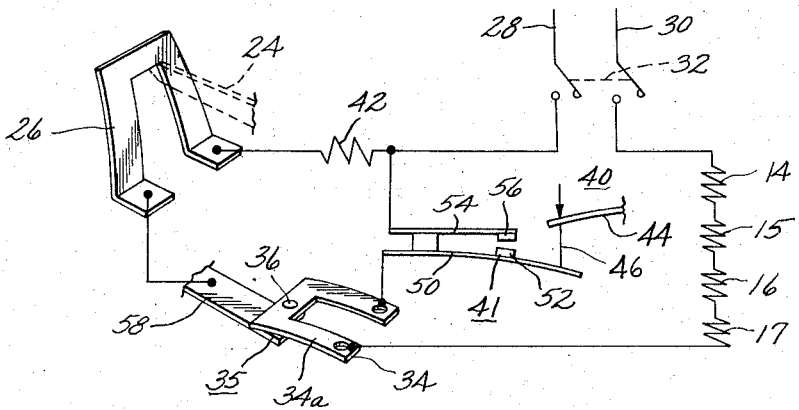
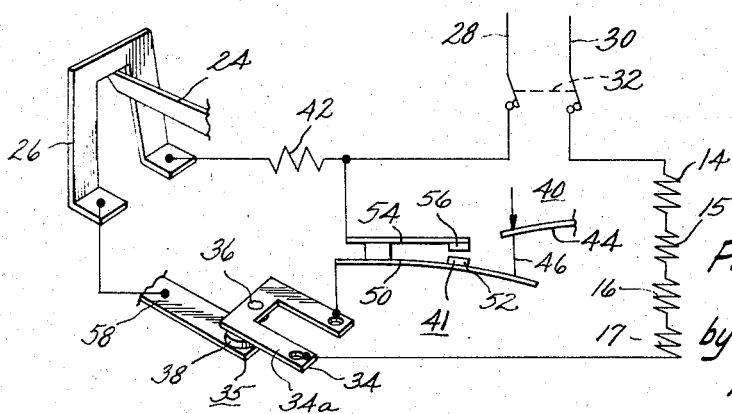
Inventor:
Paul V. Snyder.
by Lawrence R. Kempton
His Attorney 3,291,968
CONTROL MECHANISM FOR AN ELECTRIC
COOKING APPLIANCE
Paul V. Snyder, Fullerton, Pa., assignor to General Electric Company, a corporation of New York
Filed Dec. 11, 1963, Ser. No. 329,622
11 Claims. (Cl. 219—489)

This invention relates to electric cooking appliances such as toasters or the like, and more particularly to an improved control mechanism for such an appliance.

One means of controlling the duration of the heating cycle for a toaster or similar appliance is to employ a device which senses the surface temperature of the bread or other food being heated and controls a switch in the heating circuit in accordance with the temperature. Such detectors typically include a bimetallic member which is exposed to the surface of the food being heated, causing the bimetallic member to deflect and move to control a detector switch. A common problem which exists with detectors of this nature is that after a heating cycle, the bimetallic member must usually be cooled to permit the switch to close so that a second cycle can be initiated.

In some portable cooking appliances, such as the pop-up toaster, operation is started by lowering the bread carrying mechanism or carriage, simultaneously closing a main switch; and means are provided for latching the carriage in its depressed position for the duration of the toasting operation. The unlatching device for releasing the bread carriage is frequently electrically connected in parallel with the detector switch. While the switch is closed, the device does not receive enough current to operate; however, when the switch is open all current flows through the unlatching device causing it to function. Accordingly, if the bimetallic member of the detector has not adequately cooled after a toasting cycle to permit closing of the detector switch, the unlatching mechanism will function to prevent the carriage from being latched in the depressed position. Hence, there is a delay during which the user must wait before the carriage mechanism can be once more latched. Such delay is, of course, inconvenient and may cause the user to feel that the toaster is malfunctioning.

It is a general object of the present invention to provide an improved control mechanism for an automatic toaster or similar cooking appliance by which the appliance may be operated almost instantly after a preceding operation has been completed.

It is another object of this invention to provide rapid latching of the bread moving mechanism in a toaster after a preceding operation of the toaster has been terminated by a toast temperature detector.

Yet another object of this invention is to provide a mechanism for latching the starting lever of a toaster prior to automatic initiation of the heating cycle.

In carrying out the invention in one form, there is provided a control system for a cooking appliance, such as a toaster, including a main heater and a line switch for controlling the main heater. When a cooking operation is initiated, the line switch is manually closed, and a latch within the appliance maintains the line switch in its closed position. Associated with the latch is an electrically operated release means to trip the latch, whereupon the line switch opens and the cooking cycle is terminated. The signal to terminate the cooking operation is obtained from a detector switch within the appliance which opens responsive to the temperature of the food being cooked when the cooking operation is complete. An additional control circuit is provided to operate in conjunction with the detector switch and the latch release means, with this control circuit prepared for operation upon initial closure of the line switch and the detector switch. Subsequently, when the detector switch opens, the control circuit operates to energize the latch release means so that the latch is released and the cooking cycle is terminated. The control circuit further operates to prevent the latch from being tripped during the period after the latch is closed and before the detector switch is closed.

The subject matter regarded as the invention is particularly pointed out and distinctly claimed in the concluding portion of this specification. However, the organization and method of operation of the invention, together with further objects and advantages thereof, may be best understood by reference to the following description taken in connection with the accompanying drawings in which:

FIG. 1 is a somewhat schematic perspective view of a toaster embodying the present invention;

FIG. 2 is a schematic diagram of the control mechanism of the invention just after the initiation of a toasting operation;

FIG. 3 shows the diagram of FIG. 2 at the completion of the toasting operation; and FIG. 4 shows the diagram of FIG. 2 at the start of a toasting operation initiated almost immediately after the termination of the previous toasting operation.

By way of illustration, the invention is shown in FIG. 1 as being incorporated into a pop-up type toaster. However, since the unique control circuit of the invention may be utilized in various types of toasters and similar cooking appliances, many of the structural details of the toaster are not essential to an understanding of the invention and hence are shown somewhat schematically. In accordance with one arrangement, a toaster shell 2 is provided with apertures 4 for receiving bread slices 6, which are positioned by suitable guide members not shown. There is provided a bread carriage mechanism including a bread carrier 8 and an integral control lever 9, extending through a slot 20 in one end of the toaster shell 2. The carriage mechanism is normally biased to an upper position by a spring 10 extending between the bread carrier 8 and a fixed frame member 12. For toasting the bread, there is provided a plurality of suitable heating units schematically shown at 14, 15, 16 and 17.

The carriage mechanism may of course be lowered by manual depression of the lever 9 against the resistance of spring 10, to the operative position shown in FIG. 1. In order to retain the carriage mechanism in the depressed or operative position, there is provided a suitable latch mechanism which by way of example may include an insulated finger 24 mounted on a portion of the carriage mechanism and extending to cooperate with a flexible U-shaped member 26. Since an unlatching means is also required, member 26 is made of a temperature responsive material to serve both a latching and an unlatching function. Naturally, the more usual arrangement of separate latching and unlatching devices may be utilized if desired. It will be understood that the bimetallic latch member 26 is flexible and will deflect when heated. When member 26 is in its cold or latching position, as shown in FIG. 1, finger 24 deflects member 26 as the carriage mechanism is lowered, and the member snaps back to its normal position to engage the finger when the control lever is released to thereby restrain the carriage mechanism. When member 26 is heated, it deflects out of engagement with finger 24 to thus permit the carriage mechanism to move upwardly in response to the urging of spring 10. The heat for the operation of the bimetallic member 26 is provided by including the member in the electrical circuitry of the toaster as will be later described. Alternatively, an auxiliary heater in the circuit may be utilized to control member 26.

The additional elements of the circuitry are as follows: line terminals 28 and 30, a 2-pole main switch 32, the toaster heater units 14–17, a control bimetallic member 34, a control switch 35, a bread temperature detector 40, an auxiliary detector switch 41, and a resistor 42 (not shown in FIG. 1).

The bread temperature detector 40 is illustrated as including a bimetallic arm 44 having one end attached to a support and the other end free to move. By being positioned in close proximity to the surface of a slice of bread, the detector arm receives radiant heat from the bread during the toasting operation to thereby sense the bread temperature. When the toaster bread temperature reaches the level corresponding to the desired amount of toast brownness, the free end of detector arm 44 will flex downwardly as viewed in the drawings. Rod 46 and its insulated tip 48 will transmit the detector arm movement to detector switch 41.

Switch 41 includes a flexible arm 50 carrying contact 52 and an arm 54 carrying contact 56, which cooperates with contact 52. Arms 50 and 54 each have one end fixed and their opposite ends free. An extension 55 on arm 50 cooperates with rod 46 to be moved thereby. Switch 41 is normally closed wherein contacts 52 and 56 are engaged, and thus downward movement of rod 46 against the end of arm 50 separates the contacts thereby opening the switch. It should be recognized that this is merely one example of a suitable arrangement and that various other detector switches may be employed to accomplish the desired result.

The control bimetallic member 34 has been given a U-shape and its open ends are fixed in insulated relation on the toaster while the closed end is free to move. As shown, member 34 carries a contact 36 on the closed movable end which cooperates with a contact 38 mounted on one end of arm 58 to form a control switch 35. The opposite end of arm 58 is supported in insulated relation on the toaster base plate. Bimetallic member 34 and its contact 36 are so arranged with respect to contact 38 that when the bimetallic member is cold it assumes a position wherein contacts 36 and 38 are separated. When bimetallic member 34 has been heated to a predetermined level, it deflects to a position wherein contacts 36 and 38 of switch 35 are closed.

Refer now to the circuit diagrams of FIGS. 2–4 for a description of the toaster electrical circuitry connections and operation. As seen therein, the heating units 14–17 are serially connected with the main switch 32 and the detector switch 41. The latching bimetallic member 26 is serially connected with resistor 42, and both are connected in parallel with the auxiliary detector switch 41. In accordance with the invention, to obtain rapid latching of the carriage mechanism between toasting cycles, the parallel connection between member 26 and the detector switch 41 is controlled by switch 35 actuated by bimetallic member 34. More specifically, the entire length of member 34 is serially, permanently connected with switch 41 and the heating units; whereas, one leg 34a of the member is serially connected with latching and unlatching member 26 as determined by the operation of switch 35. When switch 35 is open current does not flow to member 26; when closed, current flows through leg 34a and member 26.

Toasting operation is commenced by depression of lever 9, which as shown in FIG. 1, closes main switch 32. Assuming bread temperature detector arm 44, bimetallic latch 26 and U-shaped bimetallic member 34 are all in their cool positions, the control mechanism will be as shown by the solid lines in FIG. 2. That is, the carriage mechanism and finger 24 are restrained in the operative position by the latch 26; the bimetallic member 34 is in position where control switch 35 is open and the detector switch 41 is closed. Hence, current will flow through main heaters 14–17, detector switch 41, and bimetallic member 34. The resistance of member 34 is such that the line current flowing therethrough quickly raises its temperature to a high level, perhaps 1000° F., causing it to deflect to the position shown in FIG. 2, wherein switch 35 is closed. The circuit through bimetallic member 26 is thereby completed; however, in view of resistor 42, essentially no current flows through such member when the detector switch 41 is closed. Hence, the carriage mechanism is not released.

When the temperature detector senses that the bread has obtained its desired surface temperature, the detector switch 41 is automatically opened and line current flows through the other portion of the parallel circuit causing the latching bimetallic member 26 to deflect. This releases finger 24 permitting the carriage mechanism to raise in response to the urging of spring 10, thus opening the main switch 32 and terminating the toasting operation. The position of the various elements of the control mechanism at this point is as shown in FIG. 3.

Upon the opening of main switch 32, bimetallic members 26 and 34 cool very quickly by virtue of the fact that they had been raised to a very high temperature level by the heating produced by the line current. Hence, in accordance with the invention, the lever 9 may be once more depressed to immediately initiate a second toasting operation and the carriage mechanism will be latched in its operative position by the latch 26. Since the control bimetallic member 34 has also cooled so that the control switch 35 is open, current cannot flow through the latch 26. Note that the latch mechanism is operative even though the slower cooling detector arm 44 may yet be sufficiently heated to hold the auxiliary switch 41 in an open position. At this point, the elements of the control mechanism will appear as shown in FIG. 4.

Once the bread temperature detector has cooled sufficiently to permit the detector switch 41 to close, the heater units will be automatically energized and the components will once more be in the position shown by solid lines in FIG. 2. It should be noted that the mass of the relatively cold bread speeds the cooling of the detector arm 44. Within a relatively short time interval, the line current flowing through the bimetallic member 34 will once more cause it to flex into the position of FIG. 2 closing switch 35, and the operation will continue as previously explained. Thus, it will be appreciated that with the unique control mechanism of the invention, the latching mechanism is operated somewhat independently of the toaster heating cycle. That is, the lever 9 may be manually operated to initiate a second toasting operation, even though the heating of the toast does not immediately commence. However, the user needs only to perform the single operation.

The advantages of the unique control bimetallic member 34 and the associated control switch 35 may perhaps be best appreciated by considering the operation of the toaster in the absence of these components. That is, assume that the bimetallic member 26 is continually connected in parallel with the detector switch 41. The toasting operation would be initiated by manually depressing lever 9 and, if starting with a cool toaster, a first toasting cycle would be entirely satisfactory. In the event it is desired to immediately initiate a second toasting cycle, the user will once more depress lever 9. Due to the high temperature level of the bimetallic member 26 when it is moved to its unlatching position, the member cools very quickly to resume its latching position. However, if the bimetallic detector arm 44 has not cooled sufficiently to close the detector switch all current would flow through the bimetallic member 26 causing it to quickly deflect and release the carriage mechanism before appreciable toasting could occur. Under certain circumstances a delay time may be as long as forty seconds.

Naturally, such operation is very annoying and inconvenient to the user and might make the user feel the toaster was not operating properly. With the unique arrangement of the invention, the unlatching member can be easily constructed so that it will cool sufficiently to permit latching in three or four seconds. In view of the foregoing, the advantages of the invention should be readily apparent.

While there is shown and described a particular embodiment of the invention, it is not desired that the invention be limited to the particular construction disclosed, and it is intended by the appended claims to cover all modifications within the true spirit and scope of the invention.

What I claim is:

1. In an electrically operated cooking appliance including a main heater and a line switch for controlling the main heater, manually operated means to close said line switch to initiate a cooking cycle; latch means to maintain said line switch closed; electrically operated release means for said latch means to terminate the cooking cycle; a detector switch in electrical series with the line switch to energize the main heater when closed; means responsive to the temperature of the food being cooked for opening said detector switch when the cooking operation is complete; an electrically operated control switch which when closed, forms a series electrical control circuit with said release means while said series control circuit is in electrical parallel with said detector switch; and means for operating said control switch to its closed position in the series circuit with said detector switch and line switch and further connected in series with said release means, and said release means is operated when said line and control switches are closed and said detector switch is open.

2. In an electric cooking appliance having food heating means, means for initiating operation of the appliance and latch means for retaining said operation initiating means in its operative position, an electric circuit comprising: a main switch connected in series with said heating means and controlled by said operation initiating means; a detector switch connected in series with said heating means and said main switch; means responsive to the temperature of the food being heated for controlling said detector switch and thus the energization of said heating means; means for unlatching said latch means and thus terminating operation of the appliance; a control switch; said unlatching means and said control switch forming a series circuit connected in parallel with said detector switch when said detector and control switches are closed; said circuit including sufficient resistance such that the unlatching means can only receive sufficient energy to release said latch means when said detector switch is opened; and control means connected in series with said detector switch and said unlatching means when said switches are closed for controlling said control switch; said control means and said control switch being arranged such that the control switch is closed when the control means is energized; said unlatching means and said control means having quick recovery time after said main switch has been opened so that said latch means is almost immediately ready to be operated again.

3. The invention of claim 2 wherein said unlatching means operates in response to temperature changes.

4. The invention of claim 2 wherein said control means operates in response to temperature changes.

5. The invention of claim 2 wherein said unlatching means is a bimetallic member.

6. The invention of claim 5 wherein said control means is a bimetallic member.

7. The invention of claim 2 wherein said unlatching means is heat responsive and said control means is a bimetallic member.

8. The invention of claim 2 wherein said means responsive to the temperature of the food being heated is a bimetallic detector, and said control means is a bimetallic member.

9. The invention of claim 8 wherein said unlatching means is a bimetallic member.

10. The invention of claim 2 wherein said control means is a U-shaped bimetallic member and said control switch includes a contact mounted on the closed movable end of said U-shaped member so that when said control switch is closed one leg of the U-shaped member is serially connected with said unlatching means.

11. The invention of claim 10 wherein said unlatching means is a bimetallic member.

References Cited by the Examiner

UNITED STATES PATENTS

| | | | |
|---|---|---|---|
| 2,179,811 | 11/1939 | Brosseau | 219—489 |
| 2,266,301 | 12/1941 | Biebel | 99—328 |
| 2,362,751 | 11/1944 | Huck | 99—329 X |
| 2,549,094 | 4/1951 | Huck | 99—329 X |
| 2,558,199 | 6/1951 | Scharf | 99—329 |
| 2,560,261 | 7/1951 | Thomas | 99—329 |
| 2,605,696 | 8/1952 | Gerber | 99—329 |
| 2,616,357 | 11/1952 | Humphrey | 99—329 |
| 2,624,268 | 1/1953 | Horvath | 99—329 |
| 2,624,824 | 1/1953 | Daiger | 219—489 |
| 2,750,873 | 6/1956 | Sivacek | 99—329 |
| 2,865,279 | 12/1958 | Palmer | 99—329 |
| 2,906,194 | 9/1959 | Schwaneke | 99—329 |

RICHARD M. WOOD, *Primary Examiner.*

BILLY J. WILHITE, *Examiner.*

L. H. BENDER, *Assistant Examiner.*